(No Model.)
S. RUGGLES.
PLANT DUSTER.
No. 243,727.                    Patented July 5, 1881.
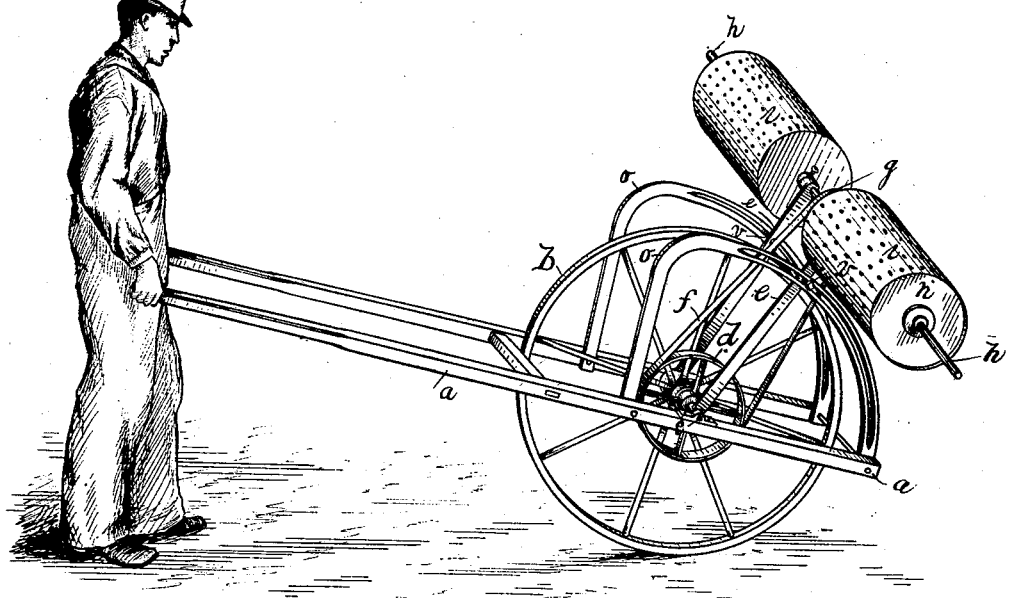
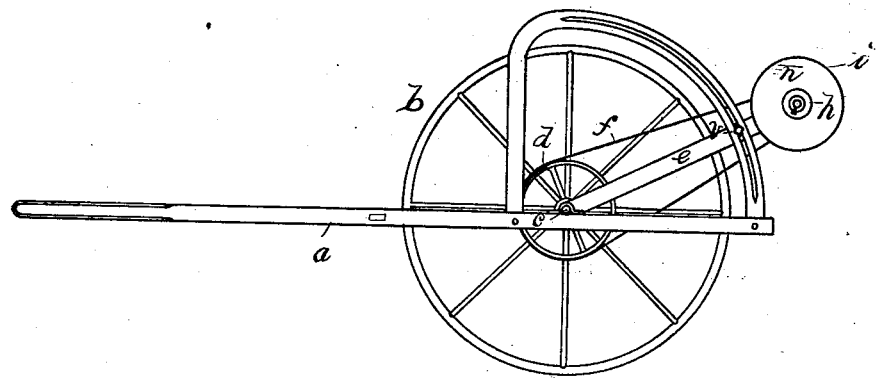
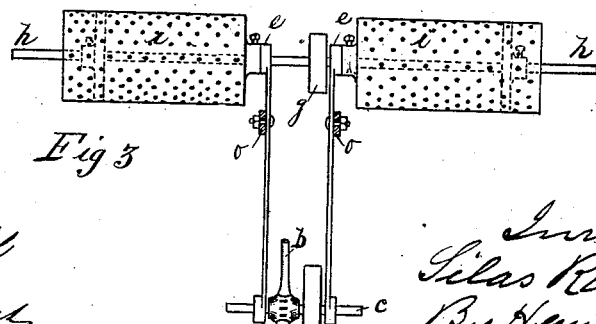
Witnesses
J. D. Garfield
G. N. Bowers
Inventor
Silas Ruggles
By Henry A. Chapman
Atty

UNITED STATES PATENT OFFICE.

SILAS RUGGLES, OF PALMER, MASSACHUSETTS.

PLANT-DUSTER.

SPECIFICATION forming part of Letters Patent No. 243,727, dated July 5, 1881.

Application filed April 29, 1881. (No model.)

*To all whom it may concern:*

Be it known that I, SILAS RUGGLES, a citizen of the United States, residing at Palmer, in the county of Hampden and State of Massachusetts, have invented new and useful Improvements in Plant-Dusters and Fertilizer-Droppers, of which the following is a specification.

This invention relates to the details of the construction of a machine for dusting plants with paris-green and other like powdered substances to destroy insects, and for other purposes, and for sprinkling fertilizers over plants, &c., the object being to provide a machine for this purpose which will deliver the material to be sprinkled upon the plants about as fast as a man will walk between the rows thereof, one which agitates the material automatically, one which permits of adjusting the powder-holders at a proper distance over the plants with great facility, and which can be used without danger of inhaling the poisonous dust which is discharged from the machine onto the plants.

In the drawings forming part of this specification, Figure 1 is an isometric elevation of a plant-duster embodying my improvements. Fig. 2 is a side elevation of the same. Fig. 3 is an elevation of the cylinders and supporting devices detached from the machine.

In the drawings, $a$ is the frame of the machine. $b$ is its supporting and carrying wheel. $c$ is the shaft on which wheel $b$ is hung. $d$ is a pulley on shaft $c$. $e\ e$ are drum-shaft supports adapted to swing on shaft $c$. $f$ is a belt. $g$ is a pulley on the drum-shaft $h$. $i\ i$ are powder-drums or perforated cylinders on shaft $h$. $n$ is a movable head in cylinder $i$. $o\ o$ are curved slotted frames adapted to hold supports $e\ e$ in proper position. $v\ v$ are bolts through frames $o$ and supports $e$.

Like letters refer to like parts in all the figures.

The frame $a$ is constructed of two bars framed together, as shown, within which is left a space of sufficient length to receive the wheel $b$, upon which the machine is supported and moved. Said wheel $b$ is hung upon a shaft, $c$, which turns in suitable boxes secured upon frame $a$, as shown; and a pulley, $d$, is fixed upon said shaft $c$ next to the hub of wheel $b$ and within frame $a$. Two curved slotted frames, $o$, are secured to frame $a$, one upon each side of wheel $b$, as shown, and the drum-shaft supports $e\ e$ pass up from shaft $c$ by the inner sides of said frames $o$, and a bolt, $v$, is placed in each of said supports $e$, in such position that it will project through the slot in frame $o$, and a nut on the outer end of said bolt can be screwed against said frame, thereby securing said supports at any point within the radius of the circle described by the form of the frames $o$. Said supports $e\ e$ are hung on shaft $c$, as shown in Fig. 3, and the shaft $h$, which carries the cylinders $i$, passes transversely through their upper ends, and revolves therein by means of the belt $f$ running over the pulley $d$ on shaft $c$, and the pulley $g$ on shaft $h$ between the ends of supports $e\ e$.

The perforated cylinders $i\ i$ are made of perforated tin or other similar material, which is suitable for holding and allowing the powder or fertilizer placed in them to shake through their sides as they are revolved, and are provided with heads, as shown, the heads next to supports $e$ being secured in the end of the cylinder, and each having a hub provided with a suitable set-screw, by which said head can be secured at any convenient place upon shaft $h$. The heads $n$ in the outer ends of cylinders $i$ are movable upon shaft $h$ and within said cylinders, for the purpose of varying their dusting-surface, and are also provided with set-screws for securing them in place. Shaft $h$ is made to project beyond the outer ends of cylinders $i$, thus providing convenient means for adjusting said cylinders thereon, so that they will operate properly directly over rows of plants of different widths, as they can be set at different points on said shaft.

An important feature in the construction of this machine, and one possessing great advantages, is that by which the cylinders $i\ i$ can be carried and revolved at any desired point from that directly over the shaft $c$ to one opposite the extreme end of frame $a$. This feature provides means for adjusting the height of said cylinders to correspond with that of the plants over which they may be moved, and at different distances from the ground. This is of great convenience in strong winds, when it is desirable to carry the cylinders low to prevent wasting of the powder, and to prevent the latter from being blown in the face of the operator, though the construction and operation of this machine permit the operator to always stand to the "windward of it," if desirable.

The construction and operation of this machine is such that the operator can pass along with it between the rows of plants with considerable rapidity, and at the same time thoroughly dust the plants.

By making the cylinders of coarsely-perforated material this machine may be used to great advantage in evenly and economically distributing fertilizer over land.

When it is desirable to transport the machine with its cylinders filled with powder to a distant field of operation the belt $f$ may be run off from its pulleys, and thus little or none of the contents of the cylinders will be wasted in transportation while the machine is rolled along, as said powder inclines to pack solidly on the bottom of said cylinders when the machine is moved without revolving them.

In operating this machine belt $f$ is properly adjusted on pulleys $d$ and $g$, and the powder or other material to be sprinkled upon the plants, is placed in the cylinders $i$ $i$, and the operator then passes along between the rows of plants, pushing or drawing the machine, and the rotary movement of wheel $b$ is through the above-described devices imparted to shaft $h$, causing cylinders $i$ $i$ to be revolved and their contents to be shaken through their sides and to drop upon the plants.

It will be seen that by lowering shaft $h$ well down to the end of frame $a$, the cylinders may be carried in such a position that they will be operated over the extreme ends of rows of plants.

What I claim as my invention is—

1. In combination with shaft $h$, carrying the perforated cylinders $i$ $i$, the frame $a$, the supports $e$ $e$, provided with bolts $v$, the shaft $c$, and the curved slotted frames $o$ $o$, substantially as set forth.

2. In combination with the shaft $h$, the perforated cylinders $i$ $i$, having one head, $n$, thereof adjustable longitudinally within said cylinders upon said shaft, frame $a$, the supports $e$ $e$, provided with bolts $v$, the shaft $c$, and the curved slotted frames $o$, substantially as set forth.

SILAS RUGGLES.

Witnesses:
CHARLES L. GARDNER,
ELISHA GARDNER.